April 16, 1957   W. E. LYND   2,788,908
VEHICLE SUSPENSION AND RAISING AND LOWERING MEANS
Filed Oct. 29, 1953   4 Sheets-Sheet 4
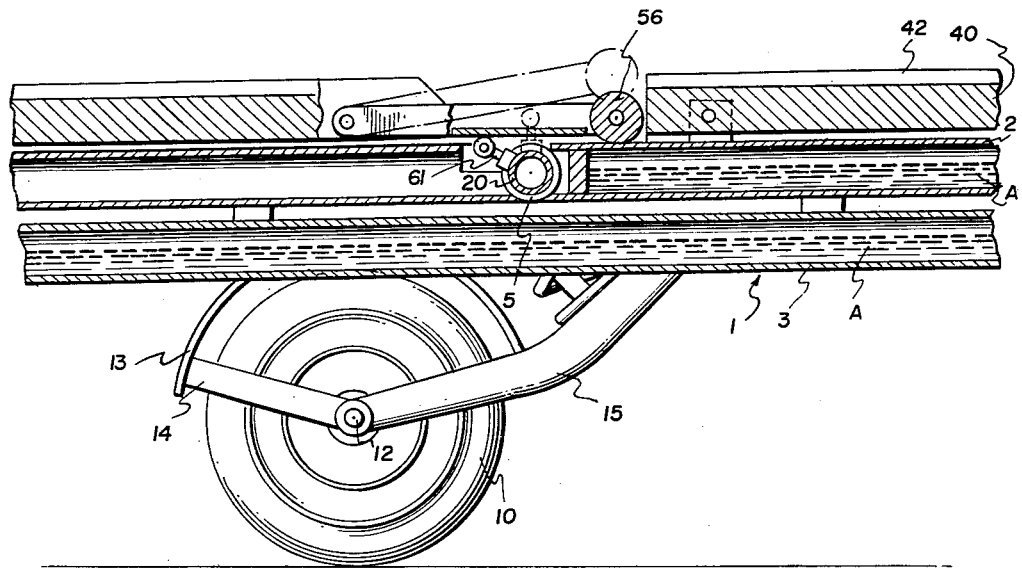
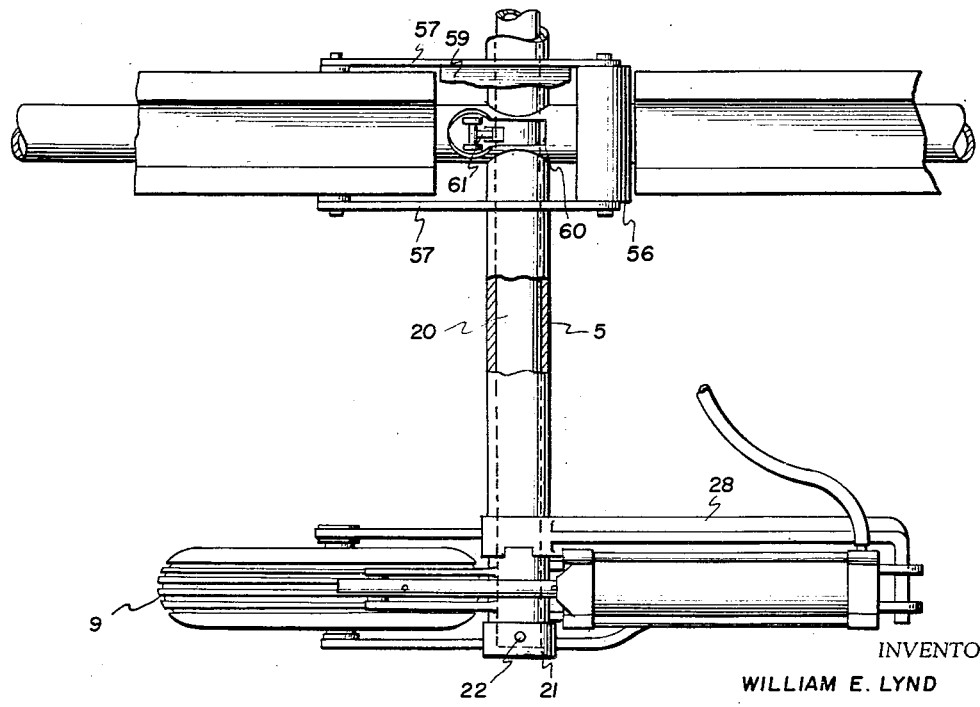
INVENTOR
WILLIAM E. LYND

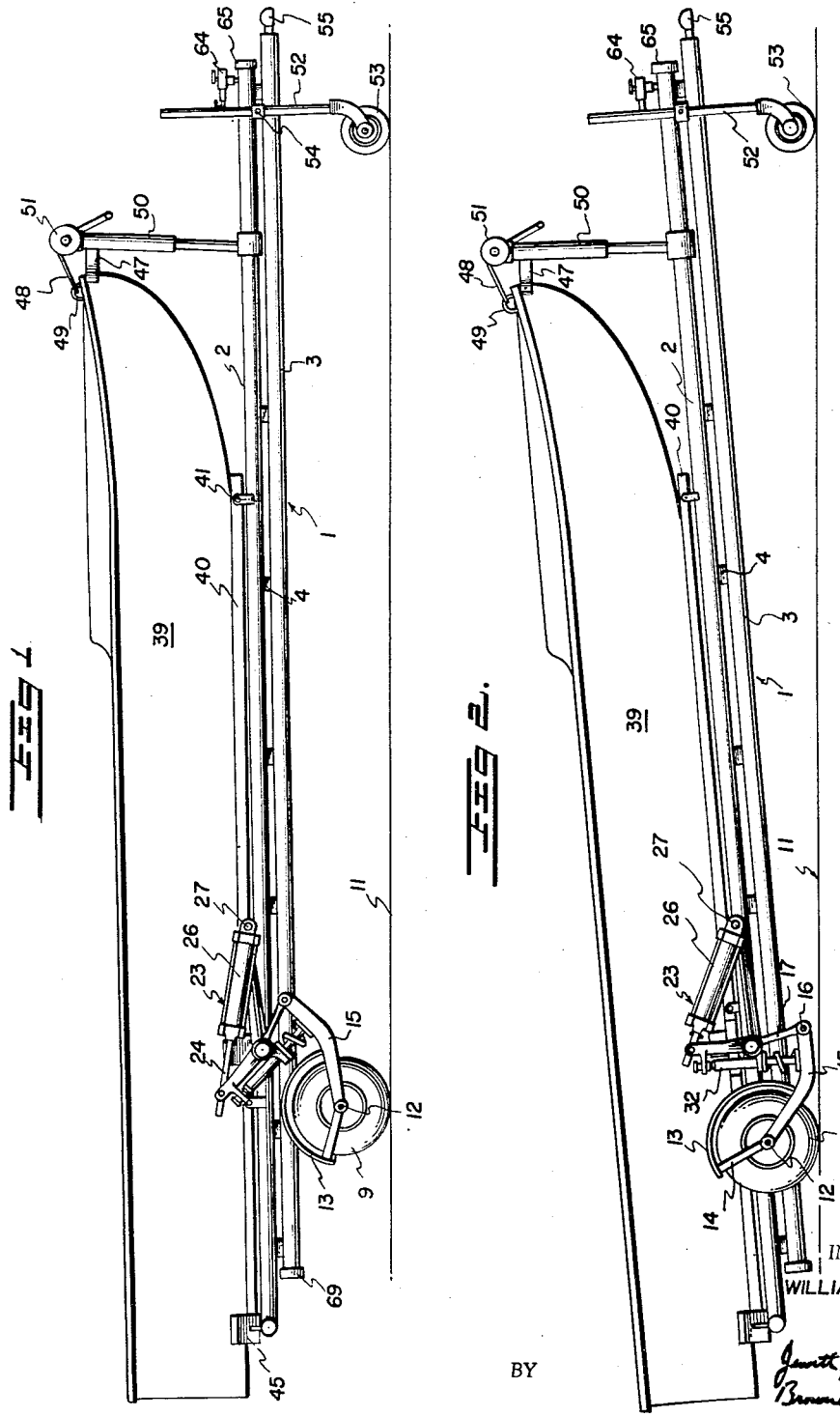

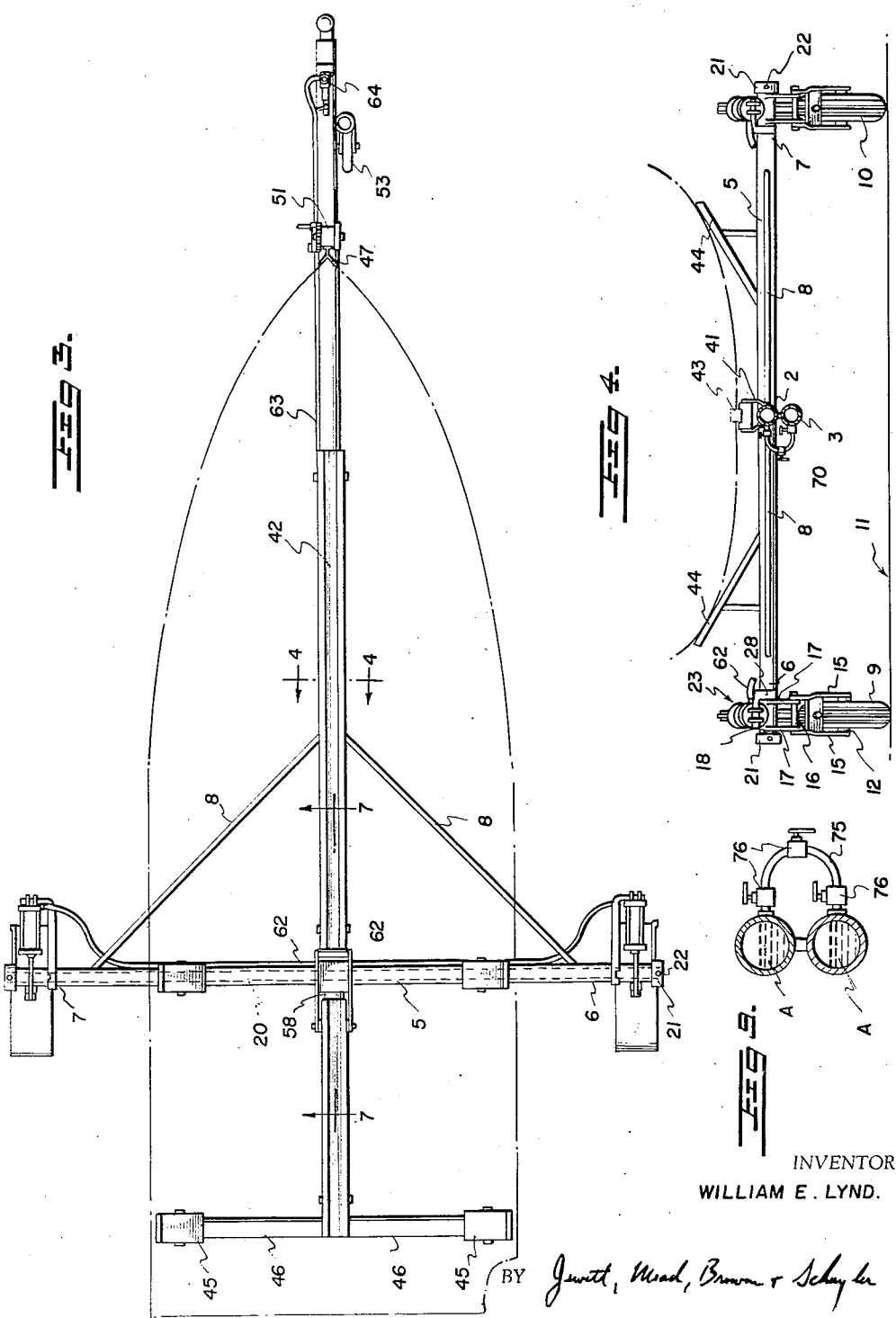

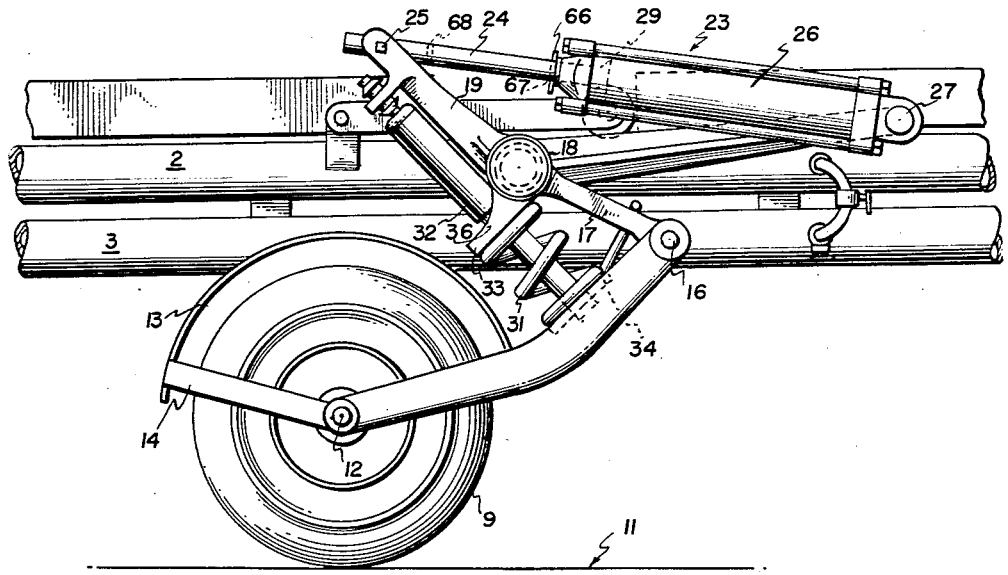
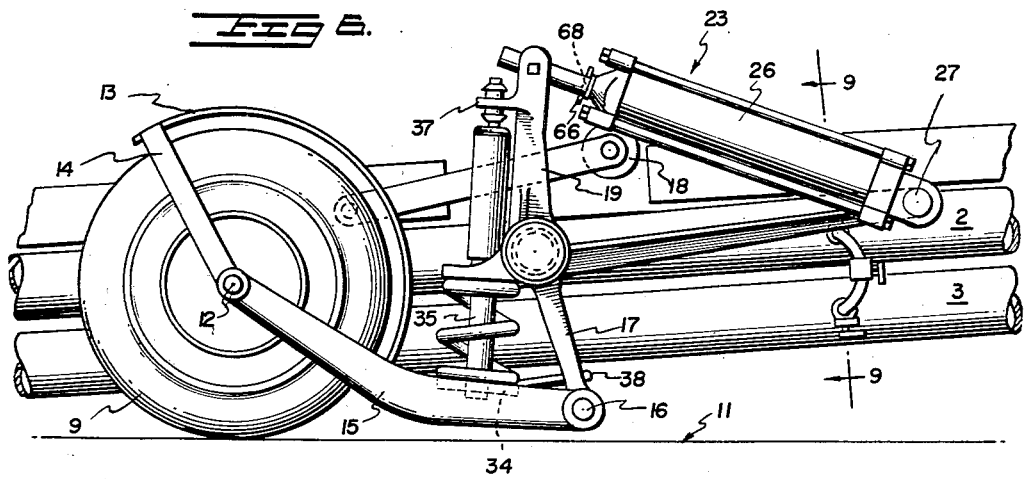
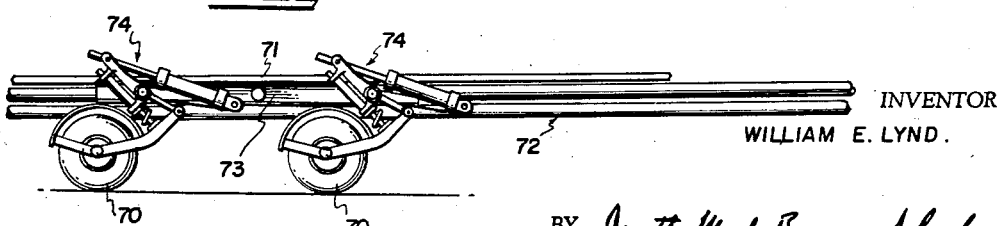

United States Patent Office 2,788,908
Patented Apr. 16, 1957

2,788,908
VEHICLE SUSPENSION AND RAISING AND LOWERING MEANS

William E. Lynd, Corpus Christi, Tex.

Application October 29, 1953, Serial No. 389,129

8 Claims. (Cl. 214—505)

This invention relates to a vehicle suspension and raising and lowering means, and more particularly to means for suspending a vehicle frame above a ground surface over which the vehicle is adapted to travel, said means being capable of lowering or raising said frame, or at least a portion of said frame, toward or from said ground surface.

The present invention is directed to the problem of providing a vehicle capable of carrying an article or articles wherein said article may be loaded onto said vehicle readily or removed from said vehicle readily. More specifically, the present invention is directed to the problem of providing means whereby a vehicle frame, or at least a portion of said frame, may be readily lowered toward the ground to facilitate loading an article onto the vehicle, may then be raised from the ground to elevate said article and maintain it in an elevated position while the vehicle moves from one place to another, and may then be lowered again toward the ground to facilitate discharge of the article.

A trailer type vehicle, such as a boat trailer, is an example of a vehicle wherein the present invention has especial utility. A boat trailer constructed in accordance with the teaching of the present invention is readily adapted to be backed up to water's edge whereupon the frame can be lowered to load or unload a boat. It is apparent that other types of vehicles, including vehicles used on farms to carry tractors and the like, can well incorporate the present invention. Hence, in a broader sense, the present invention is directed to the problem of providing an economical, powerful and efficient jack system.

It is accordingly an object of the present invention to provide a new and improved means for suspending a vehicle frame with respect to a ground surface over which the vehicle is adapted to travel.

It is another object of the present invention to provide such a means wherein the vehicle frame, or at least a portion thereof, may be lowered toward or raised from the ground surface to facilitate loading and unloading of the vehicle.

It is a further object of the present invention to provide a new and improved jack system incorporating a container for gas under pressure and a method of charging said container with gas under pressure.

Briefly described, one embodiment of the present invention is a trailer type vehicle having a longitudinally extending hollow tubular frame member and a transverse frame member connected crossways thereto adjacent the rear end of the vehicle. A ground engaging wheel is positioned adjacent each end of the transverse frame member and is connected to said end by means of a linkage which includes a piston and cylinder assembly, or jack, adapted to rock said end of the transverse frame member with respect to the wheel connected thereto to either raise said end of the transverse frame member from the ground or lower it toward the ground. When both ends of the transverse frame member are raised from the ground then the longitudinally extending frame member is also raised from the ground and the rearmost end of the longitudinally extending frame member may thus be raised or lowered with respect to the ground throughout an appreciable distance. This facilitates loading and unloading the vehicle.

Each of the piston and cylinder assemblies, or jacks, is actuated in response to gas pressure and the gas used is carbon dioxide. The carbon dioxide gas is supplied to each jack from a pressure line connected through a valve to the interior of the longitudinally extending frame member which contains, at normal ambient outside temperatures, a body of liquid carbon dioxide under pressure. The longitudinally extending frame member can be charged with solid carbon dioxide or "Dry Ice," which furnishes a source of gas under pressure permitting an operator to operate the jacks a substantial number of times, for example 100 or more times before the longitudinally extending frame member has to be recharged with another charge of solid carbon dioxide.

Other objects and advantages of the present invention will become more apparent from the following detailed description taken in conjunction with the attached drawings wherein:

Fig. 1 is a side elevation view of a trailer type vehicle constituting one embodiment of the present invention, the frame of said vehicle being in up position and carrying a boat;

Fig. 2 is a view similar to Fig. 1 showing the vehicle frame in down position;

Fig. 3 is a plan view of the vehicle shown in Figs. 1 and 2, the boat being indicated in dot and dash lines;

Fig. 4 is a sectional view taken on line 4—4 of Fig. 3;

Fig. 5 is an enlarged detail view, in elevation, of a portion of Fig. 1;

Fig. 6 is a view similar to Fig. 5 and shows a portion of Fig. 2;

Fig. 7 is a sectional view taken on line 7—7 of Fig. 3;

Fig. 8 is an enlarged detail view of a portion of Fig. 3;

Fig. 9 is a sectional view taken on line 9—9 of Fig. 6; and

Fig. 10 is a smaller scale partial elevation view showing a trailer type vehicle according to another embodiment of the present invention.

It has been stated that the present invention has especial utility when embodied in a trailer type vehicle for transporting an object or objects from place to place. The drawings therefore show a boat trailer as one embodiment of the present invention but it is, of course, to be understood that the invention has general utility as regards vehicles adapted to transport an object or objects from place to place and wherein it is important to provide means to facilitate loading the object onto the vehicle and unloading it from the vehicle.

Referring more specifically to the drawings, Figs. 1–3 show a boat trailer comprising a longitudinally extending central frame member indicated generally by the reference numeral 1. This frame member is shown as comprising an upper longitudinally extending member 2 and a lower longitudinally extending member 3 disposed below member 2 and connected rigidly thereto by suitable mechanical means such as strut members 4. For strength, it is preferred to have both the upper and lower frame members 2 and 3 but they could be replaced by a single longitudinally extending frame member, if desired.

Longitudinally extending frame members 2 and 3 are preferably seamless hollow tubular members. In one embodiment according to the present invention, these members are 2 inch seamless steel tubing capable of withstanding an internal pressure of 3000 lbs. per square inch with an appreciably safety factor. The importance of this becomes more evident hereinafter.

A transverse frame member 5 is rigidly connected to longitudinally extending frame member 2 adjacent the rear end of this frame member as shown more particularly in Fig. 3. In fact, the arrangement is such that the transverse frame member and the longitudinally extending frame member form a cross as shown in Fig. 3. The transverse frame member is also preferably a hollow tubular member having oppositely disposed ends 6 and 7. Reinforcing struts 8 are connected between longitudinally extending frame member 2 and transversely extending frame member 5 as shown more particularly in Figs. 3 and 4.

The boat trailer is supported for movement by a pair of wheels 9 and 10 which engage a ground surface indicated generally by the reference numeral 11. Wheels 9 and 10 are alike and are preferably inflatable pneumatic wheels of size and strength suitable for the particular trailer loads involved. The term "ground surface" means roadway or other terrain over which the vehicle is adapted to travel.

Wheel 9 is located adjacent to and is connected with respect to end 6 of transverse frame member 5 while wheel 10 is located adjacent to and is connected with respect to end 7 of frame member 5. Since the connecting means for connecting the wheels with respect to the transverse frame member are the same for each wheel only such connecting means is described and this is the one connecting wheel 9 with respect to end 6.

Referring more particularly to Figs. 5 and 6, it will be noted that wheel 9 has an axle 12. A wheel guard 13 is connected to axle 12 by means of strap members 14. A yoke formed by a pair of arms 15 is pivotally connected at one end to axle 12 and carries a cross shaft 16 at its other end. A pair of arms 17 are pivotally connected to cross shaft 16. These arms 17 are, considered together, one arm of a bell crank lever having a hub or elbow 18 movable pivotally with respect to end 6 of transverse frame member 5 and having another pair of spaced apart arms 19 extending rigidly from hub or elbow 18 and forming the other arm of the bell crank lever. It is apparent from what has just been described that turning movement of arms 17 and 19 about the center of hub or elbow 18 will result in upward or downward movement of cross shaft 16.

Hub or elbow 18 is actually a sleeve which is mounted on an inner tubular member 20 which extends axially lengthwise through transverse frame member 5. In fact, inner tubular member 20 extends beyond each end 6 and 7 of transverse frame member 5 and each end of member 20 is provided with a cap 21 which covers each outermost end of the inner tubular member. Both cap 21 and hub or elbow 18 are keyed, or otherwise rigidly connected to, each end of tubular member 20 as indicated at 22 so that rotation or turning of hub 18 causes turning of tubular member 20. The importance of this is that if one end of the tubular member tends to turn faster than the other end, a torsional force is imparted to the lagging end tending to cause both ends to turn at the same time and in the same amount. This results in making the movement at each end of transverse frame member 5 substantially the same, as is brought out more in detail hereinafter.

A piston and cylinder assembly indicated generally by the reference numeral 23 has a piston rod 24 pivotally connected to and between the ends of arms 19, as indicated at 25, so that longitudinal movement of the piston rod with respect to cylinder 26 will cause arms 19 to turn hub or elbow 18. Cylinder 26 is, in turn, pivotally connected at 27 to a rigid arm 28 which extends from end 6 of transverse frame member 5. Piston rod 24 is connected to a piston head or cup 29, said head or cup being of any suitable design to cause the piston rod to extend when pressure is applied to the piston head. Further details concerning the specific construction of the piston and cylinder assembly are omitted since it is not per se the present invention. As will be apparent to those skilled in the art, any suitable piston and cylinder assembly may be employed.

When the piston rod 24 is in its extended position, as shown in Fig. 5, shaft 16 is in its uppermost position. It is apparent therefore that the bell crank lever comprising arms 17 and 19 and hub or elbow 18 has turned with respect to end 6 of transverse frame member 5. However, since one end of cylinder 26 is pivotally connected to rigid arm 28 extending from transverse frame member 5, extension of piston rod 24 has caused tubular member 20 and transverse frame member 5 to rise from the position shown in Fig. 5 to the position shown in Fig. 5. During this rising or lifting, the tubular member 20, transverse member 5, and the linkage comprising links 15 and the bell crank lever, all turn or pivot about wheel axle 12.

When piston rod 24 is in its retracted position, as shown in Fig. 6, shaft 16 is closely adjacent to ground surface 11 although it is obvious that the extent of closeness can be varied, as desired. Wheel guard 13 has been turned about axle 12 and the whole assembly at the rear of the vehicle, including longitudinally extending frame members 2 and 3 at the rear portion of the vehicle, is practically touching the ground surface.

Cushioning for smooth riding is provided by a strong helical spring 31 acting in conjunction with a shock absorber 32. Spring 31 is positioned between a plate-like arm 33 which projects from hub 18 and a seat plate 34 held by arms 15. A rod 35 engages seat plate 34 and is adapted to pass through an opening 36 in plate-like arm 33. Thus, despite the presence of rod 35, plate-like arm 33 may advance toward seat 34 against the resilient pressure of spring 31 which acts to cushion or smooth the relative movement between these parts and thus limits the extent to which the angle between arms 17 and arms 15 becomes more acute. Shock absorber 32 is positioned between plate-like arm 33 and a projection 37 which extends from arms 19 adjacent pivot 25, as shown in Figs. 5 and 6. Further details concerning the shock absorber are omitted since it is not per se the present invention, it being understood that the shock absorber is of any suitable construction capable of absorbing shocks caused by sudden movements of arms 15 with respect to projection 37 which is connected to one end of the shock absorber. The other end of the shock absorber is connected to rod 35.

A catch rod 38 extends from one of the arms 15 and is partially turned about one of the arms 17, as shown in Figs. 5 and 6. The purpose of catch rod 38 is to limit the extent to which arms 17 and arms 15 may spread apart, i. e., the angle between them becomes wider. This provides a safety catch which prevents the suspension assembly from turning completely about wheel axle 12 and going backwards to collapse the suspension. It is apparent that when arms 17 tend to do this they will be held by catch 38 which may be pivotally connected to one of the arms 15 and is slidable along an edge of one of the arms 17 as long as arms 15 and 17 are within a predetermined angular relation to each other.

Referring back to Figs. 1–4, a boat 39 is shown mounted upon the trailer. This boat is resting upon a longitudinally extending runner 40, preferably made of suitable wood, which extends lengthwise above the upper longitudinally extending frame member 2, being held in position by suitable means such as the upstanding strap members 41. Runner 40 is provided with a longitudinally extending central groove 42 which extends preferably throughout the length of the runner and is adapted to receive the keel 43 of the boat.

In addition to being supported by runner 40, the boat rests upon cradle pads 44 suitably supported from transverse frame member 5 and also rests upon rear cradle pads 45 supported by arms 46 extending from the rearmost end of the upper longitudinally extending frame member 2. Respective pads 44 and 45 may be made of any smooth surface material, such as a plastic material, which is easy to clean and has a slick surface. The arrangement of the pairs of pads 44 and 45 is such that they provide cradles to receive and support the boat and it is preferred that they be padded in addition to having a slick surface.

The front end of the boat is held fast by an arm 47 and a cable 48 attached to an eye 49 on the boat. Arm 47, which engages the front end of the boat, projects from an upstanding post 50 mounted upon the upper longitudinally extending frame member 2. Post 50 is preferably adjustable in height to make it adaptable to different types of boats and it carries a winch 51 at its upper end. By means of winch 51, cable 48 may be tightened to draw a boat up onto skid or runner 40 and cradle pads 44 and 45. The boat is drawn up until its front end engages projection 47 and the winch maintains itself in locked position to hold the boat firmly in place. It is found that a boat can be held so tightly in this manner that it does not have to be tied down at the rear end of the trailer for travel over ordinary roads.

The forward end portions of longitudinally extending frame members 2 and 3 are supported by a post 52 which has a caster type wheel 53 connected to the bottom end thereof, said wheel engaging the ground surface 11. An adjustable connection 54 permits the longitudinally extending frame members to be moved up and down along the post 52 to a predetermined selected height and held there. A suitable hitch 55 is provided at the forward end of lower frame member 3 for connecting the trailer to a towing vehicle.

When the trailer frame is lowered from the position shown in Fig. 1 to the position shown in Fig. 2, a roller 56, shown more particularly in Figs. 7 and 8, is raised up into contact with the underside of keel 43. Then, when cable 48 is released, the boat can be slid quickly and easily backwards off of the trailer.

Roller 56 is rotatably mounted between a pair of arms 57 which are pivotally connected at opposite sides of runner 40, as shown in Figs. 7 and 8. Furthermore, runner 40 is interrupted above transverse frame member 5, said runner having a gap 58 therein adapted to receive said roller 56 and a plate 59 which extends between arms 57 above transverse frame member 5.

Transverse frame member 5 also has an arcuate gap 60 therein located below plate 59. A lug 61 extends through this gap 60 and is rigidly connected to inner tubular member 20. When the suspension members are in the position shown in Fig. 5 of the drawings, lug 61, plate 59 and roller 56 lie below groove 42 in runner 40, being in the position shown in solid lines in Fig. 7. However, when the inner tubular member 20 turns clockwise, as viewed in Figs. 5–8, when the vehicle frame is lowered, lug 61 goes to an upright position, engaging plate 59 and lifting roller 56 upwardly to the position indicated in dot-dash lines in Fig. 7. It is apparent therefore that the roller, which is an anti-friction member, can engage and lift the keel of the boat out of runner groove 42 and thus facilitates unloading the boat from the trailer.

Power for actuating the piston and cylinder, or jack, assemblies 23 is supplied through pressure lines or conduits 62 which extend from a common single line 63. Line 63 is connected to a valve 64 which is, in turn, connected with the interior of the upper longitudinally extending frame member 2. Valve 64 is of a type which, in one position of the valve, establishes communication between the interior of frame member 2 and the interiors of cylinders 26 to admit gas under pressure from the interior of frame member 2 to the interiors of cylinders 26, and which, in another position of the valve, blocks off the interior of frame member 2 while venting or exhausting pressure lines 63, 62, and the interiors of cylinders 26. Any suitable valve mechanism capable of accomplishing these functions may be employed. The gaseous medium used to supply pressure to the piston and cylinder, or jack, assemblies 23 is preferably gaseous carbon dioxide. This gas has the practical advantages of being non-inflammable, relatively cheap, and readily obtainable in solid or liquid form. However, from a theoretical standpoint, any substance capable of generating a gas having physical properties corresponding generally to those of carbon dioxide may be employed.

In the modification of the present invention shown in Fig. 10, the vehicle frame is supported adjacent its rear end by four ground surface engaging wheels 70 instead of the two wheels 9 and 10 described above in connection with the preceding figures of the drawings. In this embodiment of the present invention, a transverse frame member 71 extends from the longitudinally extending frame members indicated generally by the reference numeral 72. Transverse frame member 71 corresponds to transverse frame member 5 while longitudinally extending frame members 72 correspond to frame members 2 and 3 described heretofore. A rocker arm 73 is pivotally connected substantially intermediate its ends to each oppositely disposed end of transverse frame member 71. It is apparent therefore that rocker arm 73 may move, or rock, in a substantially vertical plane about the end of transverse frame member 71.

A ground surface engaging wheel 70 is positioned adjacent each oppositely disposed end of rocker arm 73 and is connected with respect to said end by means of a linkage and piston and cylinder assembly indicated generally by the reference numeral 74. This linkage and piston and cylinder assembly is the same as that shown in Figs. 1–6 and described as supporting an end of transverse frame member 5 with respect to one of the ground surface engaging wheels 9 or 10. Further description of the assembly 74 is therefore deemed to be unnecessary.

Gas pressure for actuating each of the piston and cylinder assemblies is supplied through a common pressure line corresponding to pressure line 63 and, as in the preceding description, the gas is preferably gaseous carbon evolved from a source of liquid carbon dioxide contained within either one or both of the longitudinally extending frame members. It is therefore possible to actuate all four pistons simultaneously to elevate the vehicle frame and it is apparent that this modification is substantially more powerful than the modification described above in connection with the preceding figures of the drawings. Because of the pivotal connection of the rocker arms 73 with respect to transverse frame member 71, this four wheel arrangement is readily adapted to travel over irregularities in a road surface.

In a preferred method, the gaseous carbon dioxide is obtained in the system by loading either the upper frame member 2, or the lower frame member 2, or both frame members, with solid carbon dioxide or "Dry Ice." Solid carbon dioxide has the physical property that it can go from its solid state to a gaseous state which can occupy, if unconfined, a volume approximately 600–800 times its original solid state volume. Furthermore, this can be accomplished in ambient temperatures which are normal ambient temperatures for human activity, an ambient temperature of 70° F. for example. Thus, when, for example, the upper longitudinally extending hollow tubular frame member 2 is loaded with solid carbon dioxide, gaseous carbon dioxide is generated at a rate, and having a pressure, depending upon the particular ambient temperature of the atmosphere outside of the frame member.

The loading is accomplished by removing cap 65 and screwing it tightly back in place after the solid carbon dioxide has been inserted into the tubular frame member. The solid carbon dioxide evolves gaseous carbon dioxide until the vapor pressure of the gas becomes sufficiently great to liquify the carbon dioxide. The equilibrium point at which liquification occurs will of course depend upon the total volume of the frame member containing the $CO_2$ and the ambient temperature. In fact, the equilibrium point will keep shifting as temperature changes occur but, for all practicable ambient temperatures and assuming that a sufficient amount of solid carbon dioxide has been put into the frame member, there will be a reservoir of liquid carbon dioxide which is capable of evolving into gaseous carbon dioxide for use to supply power to the jacks 23. Liquid carbon dioxide is designated in the drawings by the reference character A.

In operating the jacks, after either, or both, of the longitudinally extending frame members 2 and 3 has been charged with either solid or liquid carbon dioxide, valve 64 is turned to a position wherein gaseous carbon dioxide under pressure is admitted from within the interior of frame member 2 to line 63, lines 62 and cylinders 26. This assumes, of course, that the vehicle frame is in its lower position as shown in Fig. 2 wherein piston rods 24 are fully retracted. The gaseous carbon dioxide forces piston heads 29 along cylinders 26 causing piston rods 24 to advance outwardly with respect to cylinders 26. As has been described above, this causes the bell crank made up of arms 17 and 19 and hub or elbow 18 to rotate with respect to transverse frame member 5. The frame members, including the longitudinally extending frame members 2 and 3, rise as hub 18 and the inner tubular member 20 turn. When the piston rod reaches the end of its travel, i. e., the position shown in Figs. 1 and 5, the rear end of the vehicle frame has been lifted to its running position. A pin 66 is then placed in an opening 67 in piston rod 24. Valve 64 is turned to seal off the interior of frame member 2 and exhaust pressure lines 62 and 63 and cylinders 26. When this occurs, piston rod 24 starts to retract but is held in extended position by pin 66 which engages an end of cylinder 26. The suspension is then in raised or running position and the trailer can be transported to another location, as desired.

When it is desired to unload the trailer, valve 64 is once more turned to admit gaseous carbon dioxide to cylinders 26. This urges piston rods 24 outwardly to their full extent taking the strain off of pins 66 and permitting these pins to be removed. Valve 64 is then turned to seal off the interior of frame member 2 and exhaust cylinders 26 and pressure lines 62 and 63. By suitable manipulation the operator can permit the weight of the load to ease the piston rods back into retracted position until they reach the position shown in Figs. 2 and 6. The operator will have removed pins 66 from openings 67 and will have inserted them into openings 68. As the piston rods retract pins 66 will finally abut against the ends of cylinders 26 and maintain the suspension in its lowermost position as shown in Figs. 2 and 6.

In raising or lowering, should there be a lateral unbalance of load, the inner tubular member 20 tends to keep the action of both suspension arrangements the same since it imparts a twisting or turning force to the weak member thus aiding it in doing its job. This is apparent from the fact that each piston and cylinder assembly or jack is, in effect, keyed to the inner tubular member at each end of said member.

Where it is desired to utilize both longitudinally extending frame members 2 and 3 to contain solid or liquid carbon dioxide, upper frame member 2 can be loaded by removing and then replacing cap 65 and lower frame member 3 can be loaded by removing and then replacing cap 69. A pressure line or conduit 75, see Fig. 9, interconnects the upper and lower frame members so that when the upper frame member is exhausted the lower frame member can be connected into the system. Suitable valves 76 are provided to permit individual loading and consecutive discharge of the respective frame members.

As an illustration of one embodiment of the present invention, the longitudinally extending frame members 2 and 3 are formed of 2 inch seamless steel tubing capable of withstanding 3000 lbs. per square inch pressure with an adequate safety factor. ⅛ inch copper tubing forms the lines 63 and 62 and it is capable of withstanding up to 15,000 lbs. per square inch pressure. The lines 62 are connected to piston and cylinder assemblies of suitable strength material, the piston having a 3 inch diameter and a suitable length stroke. With the dimensions given, the volume of a frame member, which may be 15 to 16 feet long, is about one-third of a cubic foot.

Assuming that only one frame member is used to hold the carbon dioxide, the frame member is packed with from 3 to 31 lbs. of solid carbon dioxide. 25 lbs. is a recommended quantity, the carbon dioxide being cut into small squares 1½" x 1½" or crushed in a bag and then inserted into the interior of the frame member. Alternatively, a 25 lb. liquid carbon dioxide container can be connected to valve 64 and the contents drained into the interior of the frame member. After the frame member is loaded and the gaseous carbon dioxide has developed under high pressure within the interior, the vehicle is then ready to lift its loads as desired. It is found that a frame member charged with carbon dioxide as just described has sufficient capacity for up to and even over 100 operations of lifting and lowering a boat having a weight, for example, of 700 lbs.

In the example just given above, wherein the volume of the frame member containing the non-gaseous carbon dioxide is approximately one-third of a cubic foot and the piston diameter is 3 inches, it is found that, when the frame member has been loaded with from 3 to 31 lbs. of solid carbon dioxide (preferably 25 lbs.) the gas pressure exerted on the piston by the gaseous carbon dioxide, which has evolved from the solid and liquid carbon dioxide, is approximately 500 lbs. per square inch around 60° F., is from 600 to 750 lbs. per square inch around 75° F. and is approximately 850 to 900 lbs. per square inch around 85 to 90° F. These are approximate figures but give an indication of the pressure available to act upon the piston. Even though the ambient temperature reaches approximately 88° F., beyond which temperature one would think that there would be no more liquid carbon dioxide, the releasing of carbon dioxide from within the frame member by opening the valve, causes an evaporation which lowers the temperature within the frame member, dropping the temperature below the critical temperature and once again causing the formation of liquid carbon dioxide.

While it can be seen from the foregoing description that the present invention provides an economical, powerful and efficient means of raising and lowering a vehicle frame or portion thereof with respect to a ground surface, in a broader aspect the present invention provides an economical, powerful and efficient jack system wherein the jack is a piston and cylinder type jack actuated by gas pressure.

Although I have described and illustrated modifications of the present invention, I wish it to be understood that I do not intend to be restricted solely thereto but that I do intend to cover all modifications thereof which would be apparent to one skilled in the art and which come within the spirit and scope of the present invention.

What I claim as my invention is:

1. In a vehicle, a longitudinally extending hollow tubular frame member, a transverse frame member connected to said longitudinally extending frame member and having an end spaced from said longitudinally extending frame member, a ground surface engaging wheel positioned adjacent said end of said transverse frame member, said wheel having an axle, a linkage pivotally connecting said end of said transverse frame member with respect to said wheel axle above said ground surface, said frame members being movable toward and from said ground surface in response to pivotal movement of said linkage about said wheel axle, a piston and cylinder assembly pivotally connected to said linkage, said linkage being pivotally movable upwardly about said wheel axle in response to outward movement of said piston with respect to said cylinder to raise said frame members with respect to said ground surface, said piston being movable outwardly with respect to said cylinder in response to gas pressure, a source of liquid carbon dioxide under pressure carried within said longitudinally extending frame member, and means to admit gaseous carbon dioxide under pressure from said source to said cylinder to cause outward movement of said piston.

2. In a vehicle, a longitudinally extending hollow tubular frame member, a transverse frame member connected to said longitudinally extending frame member, said transverse frame member having an end spaced from said spaced longitudinally extending frame member, a ground surface engaging wheel positioned adjacent said end of said transverse frame member, said wheel having an axle, a lever pivotally connected intermediate its ends with respect to said end of said transverse frame member, a link pivotally connected to and extending from one arm of said lever to the axle of said ground surface engaging wheel, a piston and cylinder assembly connected between the other arm of said lever and a rigid arm extending from said transverse frame member, the cylinder of said assembly being pivotally connected to said rigid arm and said piston including a rod pivotally connected to said other lever arm whereby movement of said piston with respect to said cylinder causes pivoting of said lever with respect to said end of said transverse frame member and movement of said end of said transverse frame member with respect to said wheel axle, liquid carbon dioxide under pressure positioned within said longitudinally extending hollow tubular frame member, and means to admit gaseous carbon dioxide under pressure, evolved from said liquid carbon dioxide, to said cylinder.

3. In a vehicle, a centrally disposed longitudinally extending frame member, a transverse frame member connected to said longitudinally extending frame member adjacent an end of said longitudinally extending frame member, said transverse frame member being a hollow tubular member having oppositely disposed ends spaced from said longitudinally extending frame member, a turnable inner tubular member extending lengthwise through said transverse frame member and having oppositely disposed ends projecting beyond the oppositely disposed ends of said transverse frame member, a ground surface engaging wheel positioned adjacent each end of said inner tubular member, each wheel having an axle, a linkage rigidly affixed to each end of said inner tubular member, each linkage being pivotally connected to the axle of the wheel associated therewith, and a piston and cylinder assembly connected to each linkage, each linkage being pivotally movable upwardly about the wheel axle associated therewith in response to outward movement of the piston associated therewith with respect to its cylinder to raise said frame members with respect to said ground surface, each linkage turning said inner tubular member in response to outward movement of the piston associated therewith whereby, should one piston lag behind the other, said inner tubular member tends to assist the lagging piston.

4. In a vehicle, a longitudinally extending hollow tubular frame member having a front end and a rear end, a transverse frame member positioned crossways with respect to said longitudinally extending frame member and connected to said longitudinally extending frame member adjacent said rear end, said transverse frame member having oppositely disposed ends spaced from said longitudinally extending frame member, a ground surface engaging wheel positioned adjacent each end of said transverse frame member, each wheel having an axle, a linkage pivotally connecting each end of said transverse frame member with respect to the axle of the wheel associated therewith, said frame members being movable toward and from said ground surface in response to pivotal movement of said linkages about said wheel axles, a piston and cylinder assembly pivotally connected to each linkage, each linkage being pivotally movable upwardly about its associated wheel axle in response to outward movement of the piston with respect to its cylinder in the piston and cylinder assembly connected to said linkage, to raise said frame members with respect to said ground surface, each piston being movable outwardly with respect to its cylinder in response to gas pressure, liquid carbon dioxide under pressure positioned within said longitudinally extending hollow tubular frame member, a single pressure line extending from said longitudinally extending hollow tubular frame member and branching to each cylinder, and valve means interposed in said single pressure line to admit gaseous carbon dioxide under pressure, evolved from said liquid carbon dioxide, simultaneously to each cylinder to raise the rear end of said longitudinally extending frame member with respect to said ground surface.

5. In a vehicle, a centrally disposed longitudinally extending frame member, a longitudinally extending runner positioned above and supported by said frame member, a transverse frame member connected to said longitudinally extending frame member adjacent an end of said longitudinally extending frame member, said runner being interrupted above said transverse frame member to provide a gap in said runner, said transverse frame member being a hollow tubular member having oppositely disposed ends spaced from said longitudinally extending frame member, a turnable inner tubular member extending lengthwise through said transverse frame member, a lug extending from said inner tubular member, said lug being movable between one position in which said lug is below said gap in said runner and another position in which said lug extends up into said gap, an anti-friction member positioned within said gap when said lug is below said gap, means engaged by said lug to raise said anti-friction member above the upper surface of said runner when said lug is moved to its position wherein it is in said gap, and means to actuate said lug to move it from one position to another whereby, when said anti-friction member is above said runner surface, an object carried on said runner may move easily off of said runner.

6. In a vehicle, a centrally disposed longitudinally extending frame member, a first transverse frame member connected to said longitudinally extending frame member adjacent an end of said longitudinally extending frame member, a second transverse frame member supported by and movable with respect to said first transverse frame member, said second transverse frame member having oppositely disposed ends, a ground surface engaging wheel positioned adjacent each end of said second transverse frame member, means connecting each wheel with respect to the end of said second transverse frame member associated therewith, each connecting means being movable to raise said second transverse frame member with respect to the wheel associated with said connecting means, and a piston and cylinder assembly connected to each connecting means, each connecting means being movable with respect to the wheel associated therewith in response to outward movement of the piston associated therewith to raise said frame members with respect to said ground surface, and each connecting means turning said second transverse frame member with respect to said first transverse frame member in response to outward movement of the piston associated therewith whereby, should one piston lag behind the other, said second transverse frame member tends to assist the lagging piston.

7. In a vehicle, a pair of oppositely disposed ground surface engaging members, a longitudinally extending hollow tubular frame member having a rear portion located centrally between said ground surface engaging members, separate means connecting said frame member portion to each of said ground surface engaging members, said frame member being movable toward and from said ground surface and each of said connecting means being movable in response to gas pressure applied to each of said connecting means to raise or lower said frame member with respect to said ground surface, liquid carbon dioxide under pressure positioned within said longitudinally extending hollow tubular frame member, and means to apply gaseous carbon dioxide under pressure, evolved from said liquid carbon dioxide, simultaneously to each of said connecting means to move said connecting means.

8. In a vehicle, a longitudinally extending frame member, a transverse frame member connected to said longitudinally extending frame member, said transverse frame member having an end spaced from said longitudinally extending frame member, a ground surface engaging wheel positioned adjacent said end of said transverse frame member, said wheel having an axle, a bell crank lever having its elbow pivotally connected with respect to said end of said transverse frame member, a link pivotally connecting one arm of said lever to said wheel axle, means supporting the other arm of said lever with respect to said transverse frame member, a cushioning spring positioned between the elbow of said bell crank lever and the link which pivotally connects one arm of said lever to said wheel axle, and a shock absorber connected to said bell crank lever and acting in conjunction with said spring to provide smooth riding.

References Cited in the file of this patent

UNITED STATES PATENTS

| | | |
|---|---|---|
| 300,290 | Troy | June 10, 1884 |
| 1,457,665 | Lucas | June 5, 1923 |
| 1,920,094 | Martin | July 25, 1933 |
| 1,926,692 | Tarbox | Sept. 12, 1933 |
| 1,963,091 | Jenkins | June 19, 1934 |
| 2,147,535 | Lankin | Feb. 14, 1939 |
| 2,453,388 | Schramm | Nov. 9, 1948 |
| 2,502,309 | Byrd | Mar. 28, 1950 |
| 2,586,485 | Schroeder | Feb. 19, 1952 |
| 2,650,730 | Rohm | Sept. 1, 1953 |
| 2,677,332 | Vollenweider | May 4, 1954 |
| 2,719,726 | Johnston | Oct. 4, 1955 |